(No Model.)
A. D. SMITH.
NUT LOCK.
No. 574,582. Patented Jan. 5, 1897.
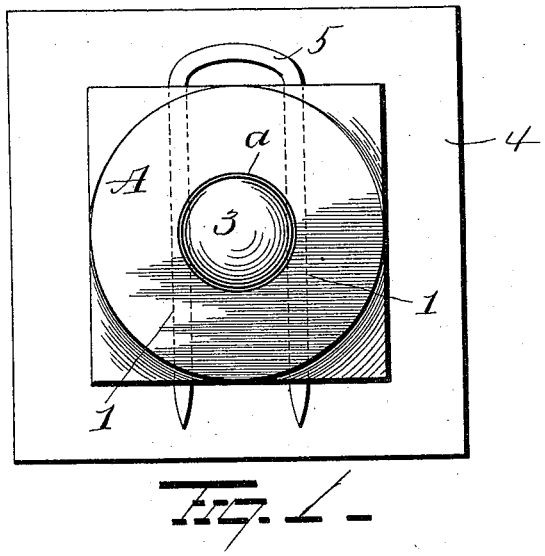
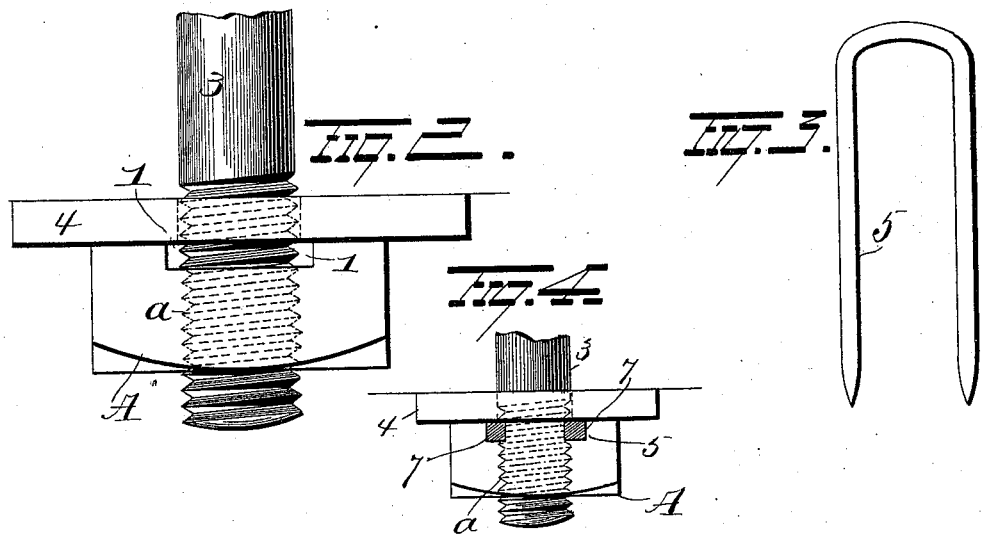
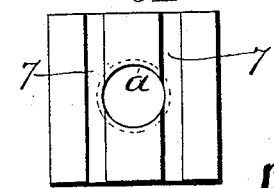
Witnesses
E. J. Nottingham.
G. F. Downing.
Inventor
A. D. Smith
By H. A. Seymour
Attorney
THE NORRIS PETERS CO., PHOTO-LITHO., WASHINGTON, D. C.

UNITED STATES PATENT OFFICE.

ALBERT DAVIS SMITH, OF PHILADELPHIA, PENNSYLVANIA, ASSIGNOR OF ONE-HALF TO P. H. MARKLEY, OF HATBOROUGH, PENNSYLVANIA, AND ALBERT W. MARKLEY, OF NEW YORK, N. Y.

NUT-LOCK.

SPECIFICATION forming part of Letters Patent No. 574,582, dated January 5, 1897.

Application filed August 20, 1896. Serial No. 603,401. (No model.)

*To all whom it may concern:*

Be it known that I, ALBERT DAVIS SMITH, a resident of Philadelphia, in the county of Philadelphia and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to an improvement in nut-locks, the object of the invention being to construct a nut-lock which shall be simple, cheap to manufacture, and effectual in all respects in the performance of its functions.

With this object in view the invention consists in certain novel features of construction and combinations and arrangements of parts, as hereinafter set forth, and pointed out in the claims.

In the accompanying drawings, Figure 1 is a view in end elevation of a bolt, showing the nut, plate, and nut-lock thereon. Fig. 2 is a detail view of the nut. Fig. 3 is a detail view of the locking-staple. Figs. 4 and 5 are views illustrating modifications.

A represents a nut having a screw-threaded hole *a* in its center. The inner or rear face of the nut is made with a rectangular groove or recess 1 of a width a little more than equal to the diameter of the hole *a*. A bolt 3 is passed through a plate 4, and when the nut A is screwed home, or nearly so, on the bolt a staple 5 is inserted into the groove or recess 1 and driven through the same, the members of said staple passing the bolt at diametrically opposite sides thereof and the threads thereon at opposite points. The ends of the staples thus have a swaging effect upon the threads, and by having two ends instead of a single locking device the threads are not sufficiently disturbed at either point to prevent the easy turning of the nut or to weaken or impair the hold of the nut upon the threads. When the staple is forced through the groove or recess 1, it will be crowded between the nut and the plate 4 and thus tend to force the nut away from the plate slightly and cause the threads in the nut to bind against the threads on the bolt and further assist in locking the nut on the bolt.

The use of the staple not only has the effect of displacing the threads on the bolt at two points, but it can be readily removed, when desired, by the use of any suitable tool.

The staple can be driven through the groove or recess in the nut until the end 6 of the staple lies flush or nearly flush with the side of the nut and thus not mar the appearance of the nut.

Instead of making the nut with a groove or recess a little wider than the diameter of the hole in the nut, the inner face of the nut may be made with two grooves 7 7, as shown in Figs. 4 and 5.

In the drawings I have shown the nut grooved parallel with its sides, but it is evident that the groove or grooves may be arranged at an angle to the sides of the nut.

Having fully described my invention, what I claim as new, and desire to secure by Letters Patent, is—

1. The combination with a nut having its inner face grooved adjacent to and intersecting the hole in the nut, of a staple of ordinary form having cutting and swaging ends and constructed to enter the groove in the nut and straddle the bolt on which the nut is screwed and wedge itself between the bolt and the wall of the groove, thereby displacing the threads at the points of contact therewith, substantially as set forth.

2. The combination with a nut having the usual threaded opening therein and a pair of parallel or approximately parallel grooves formed therein on opposite sides of the opening and intersecting the same, of a staple entering the two grooves as guides and having cutting and swaging ends adapted to displace the threads of the bolt on opposite sides thereof, substantially as set forth.

In testimony whereof I have signed this specification in the presence of two subscribing witnesses.

ALBERT DAVIS SMITH.

Witnesses:
P. H. MARKLEY,
S. Z. TRIMBLE.